Patented Nov. 14, 1939

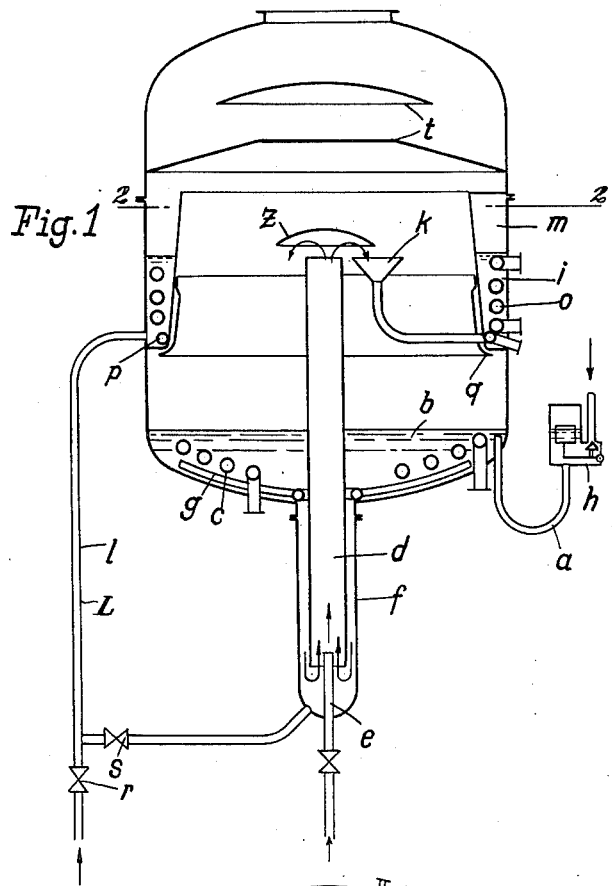
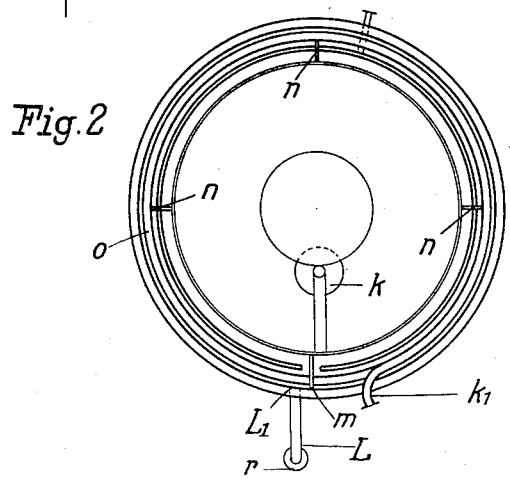

2,179,833

UNITED STATES PATENT OFFICE

2,179,833

DISTILLATION OF LIQUIDS HAVING RELATIVELY HIGH BOILING POINTS

Karl Sondermann, Frankfort-on-the-Main, Germany, assignor to American Lurgi Corporation, New York, N. Y., a corporation of New York Application September 10, 1936, Serial No. 100,117
In Germany September 30, 1935

9 Claims. (Cl. 202—46)

The present invention relates to the distillation of liquids having relatively high boiling points, and, more particularly, to a continuous, stage distillation process for liquids such as fatty acids, glycerin, and the like.

Heretofore, the conventional processes for the continuous distillation of liquids having high boiling points, such as fatty acids, glycerin, and the like, have been carried out in such a manner that the liquid to be treated was conducted at a low rate of flow through an evaporator. At the same time, the quantity of liquid introduced into the apparatus was so controlled that, by the time the liquid passed through the apparatus, the distillable components were evaporated to the desired extent. Various types of apparatus were employed for carrying out these conventional processes. One type of conventional apparatus involved horizontal troughs provided with vertical separating walls through which the liquid to be distilled was caused to stream in a horizontal direction. Other types of conventional apparatus provided a vertical flow of the liquid and were provided with distributing nozzles and discs. Considerable difficulty was experienced in the design of apparatus of the latter type which required special means for conducting the liquid to be distilled in contact with the heating surfaces. Another disadvantage of these processes was that there was very little movement of the liquid along the heating surfaces, so that larger heating surfaces were required for the indirect heating. Moreover, the slow streaming of the liquid through the apparatus greatly reduced the speed of the heat exchange within the liquid, frequently causing localized overheating and decomposition of the liquid, which not only greatly reduced the yield of distilled product but at the same time also detrimentally influenced the quality of the final product. It was also suggested to employ distillation columns provided with a suitable plurality of channel-like distillation spaces arranged one above the other, said channels having a high outer edge and a low inner edge. The liquid subjected to distillation was introduced into the channels and was caused by steam agitation to pass over the low inner edges of the channels to the lower channels through the intermediary of drip plates and similar devices. In each of the channels, heating means were arranged close to the bottom thereof but outside of the liquid space. Somewhat better results were obtained by another conventional evaporator in which steam was directly injected into the liquid to be distilled, whereby substantial quantities of the liquid were propelled upwards and were allowed to descend again along suitable surfaces. This type of apparatus and process provided very lively circulation of the liquid and reduced the danger of local overheating but had serious disadvantages when carrying out the process continuously. Since the circulated quantity of the liquid was multiple that of the distilled quantity, the content of the distillation chamber had a composition similar to that of the residues to be discharged. These residues generally were very viscous and greatly reduced the intensity of the movement or agitation of the liquid. A further disadvantage experienced in this type of process was the relatively high operating temperature since the fractions of higher boiling point also had to be distilled off. Although various other suggestions and proposals have been made, none, as far as is known, was completely satisfactory and successful when carried into practice on a commercial and industrial scale.

It has been discovered that the outstanding problem can be solved in a remarkably simple manner.

It is an object of the present invention to provide an improved process for the distillation of liquids having relatively high boiling points, which is free from the above disadvantages and inconveniences of conventional distillation processes.

It is another object of the present invention to provide a novel and improved process for distilling liquids having high boiling points, such as fatty acids, glycerin, and the like, which involves distilling the liquids in two steps or stages.

The invention also contemplates a distillation process for liquids of the character described comprising a preliminary distillation stage after which the liquid is transferred by means of steam agitation to a secondary or auxiliary distillation stage where the distillation is finished and the residue is withdrawn.

It is also within contemplation of the present invention to provide a novel apparatus for carrying the process of the present invention into practice on a practical and industrial scale.

Other and further objects and advantages of the invention will become apparent from the following description taken in conjunction with the accompanying drawing, in which:

Fig. 1 illustrates a vertical sectional view of a distillation apparatus embodying the principles of the present invention; and Fig. 2 depicts a cross section taken on line 2—2 of Fig. 1.

Broadly stated, the present invention permits obtaining the combined advantages of all of the conventional processes without any of the disadvantages thereof. According to the principles of the present invention, the distillation is carried out in two steps or stages in a distillation vessel or still. The fatty acids, glycerin or other similar liquids having relatively high boiling points are introduced into the lower portion of said vessel to form a body, pool or bath of liquid therein. This body of liquid is subjected to the effect of direct and indirect heating and to powerful vertical circulating sufficient to carry a substantial portion of the liquid above the level of said body of liquid. A portion of the vertically circulated liquid is retained or trapped and is introduced into a secondary or auxiliary distillation space or chamber forming a secondary body of liquid therein. In this secondary distillation chamber, the distillation is finished and the distillation residues of the desired composition are withdrawn. In this manner, the advantages of powerful circulation are assured for the greatest portion of the distillates produced, while the disadvantages otherwise connected with continuous operation have no effect on the preponderant quantity of the distillate produced from the final or auxiliary distillation stage.

The invention will now be more fully explained to those skilled in the art in connection with the accompanying drawing. Referring particularly to Figs. 1 and 2 of the drawing, the liquid to be distilled is introduced through a conduit $a$ into a lower distillation chamber $b$ of the apparatus. The lower distillation chamber is provided with a heating coil $c$ located at the bottom thereof for introducing the heat required for effecting the distillation. The circulation and the continuous agitation of the liquid to be distilled along the heating coil $c$ are accomplished by means of a centrally arranged circulation tube $d$ into which steam is introduced through conduit $e$. The bottom of the distillation apparatus is connected with a dip pipe $f$ which surrounds the lower portion of the circulation pipe $d$. The circulation pipe is of such length that an effective and powerful circulation of the liquid is obtained. By means of the described arrangement of the heating coil $c$, to which a heating medium, for instance, steam, is introduced by suitable means, preferably through the bottom of the apparatus and of the dip pipe $f$, it is possible to reduce the lower liquid or distillation space to very small dimensions.

The direct steam necessary for the distillation and for improving the powerful agitation of the liquid along the heating coil is introduced and uniformly distributed by means of a nozzle pipe $g$ arranged at the bottom of the distillation space and connected to a steam line. Preferably, an automatically actuated inlet valve $h$ is provided in the conduit or pipe $a$ introducing the liquid to be treated, which admits only so much liquid as has been removed by distillation, so that the liquid is maintained at a constant level in the lower distillation space or chamber.

The distillation in the lower distillation space is carried to a certain degree of concentration. In other words, it is carried on until a definite and preferred proportion between the distillable and undistillable constituents of the liquid is obtained.

During the course of the distillation process, a portion of the circulated liquid is continuously removed and is transferred into the upper secondary or auxiliary distillation space $i$ of annular cross section. This is acomplished by means of a funnel or some other equivalent member $k$ which traps a portion of the liquid circulated by the circulation pipe $d$ and deflected by a deflector plate $z$ and, through a suitable conduit which conveys the trapped liquid into the upper or auxiliary distillation space or chamber. The level of the liquid in the upper distillation chamber $i$ is determined by the position of the upper edge of funnel $k$. In this upper distillation space $i$ the final distillation is conducted of the distillable portion of the liquid, which is thus separated from the undistillable residue. The distillation residue is continuously discharged through a conduit L. The quantity of liquid residue removed through conduit L automatically controls the quantity of fresh liquid within distillation space $i$, so that it is unnecessary to provide special controlling means to this purpose.

During the distillation in the upper distillation chamber $i$, the liquid is positively conducted around the annular distillation space. This is accomplished by means of a vertical separating wall $m$ mounted in the annular distillation chamber which causes the liquid introduced by funnel $k$ and entering the distillation space at $k$—$l$ to flow completely around space $i$ up to the mouth L—$l$ of conduit L, through which the distillation residue is discharged. The path of the liquid from $k$—$l$ to L—$l$ is of such length and the heating effect of coil $o$ is so controlled that sufficient time is provided for the distillation during the period the liquid travels from $k$—$l$ to L—$l$. Preferably, vertically arranged baffle plates $n$ are provided along the path of the streaming liquid from $k$—$l$ to L—$l$, in order to prevent mixing of the continuously moving liquid entering at $m$ with the liquid leaving the distillation chamber at L.

The upper distillation chamber is indirectly heated, preferably by steam which is introduced into a heating coil $o$. A circular nozzle pipe $p$ introduces direct steam required for the distillation and uniformly distributes the steam along the full circumference of the upper distillation chamber $i$. The operating pressure of the heating steam in the upper heating coil $o$ is higher than that in the lower coil $c$, because the distillation in the upper distillation chamber requires higher temperatures. For this reason, it is advisable to provide the upper distillation chamber with a double wall $q$ which prevents excessive radiation of heat and overheating of the liquid propelled upwards from the lower distillation chamber $b$.

The apparatus embodying the principles of the invention may also be used for semi-continuous operation or for operation with individual charges. This can be accomplished by throttling or completely closing control valve $r$ in conduit L and by opening closure valve $s$ whereby continuous circulation is obtained between the upper distillation chamber $i$ and the lower distillation chamber $b$ through the intermediary of circulation pipe $d$ and funnel $k$.

In the upper portion of the apparatus, a separator $t$ is provided which separates the liquid particles carried over by the distilled vapors from the upper and lower distillation chambers. The separated particles of the liquid may be returned, for example, to the lower distillation chamber $b$.

It is to be noted that the invention provides a number of important advantages. First of all, the quantity of liquid present in the apparatus is very small so that the undistillable part of the liquid is exposed for only a relatively short time to the effect of the distillation temperatures, whereby losses and deterioration of the liquid by decomposition are prevented.

It is also to be observed that the liquid is maintained in lively agitation and movement along the heating surface, which causes very favorable heat exchange conditions, so that only low temperature differences are required between the heating surface and the liquid to be distilled and, in addition, the distillation can be carried out at relatively low temperatures.

Moreover, local overheating of the liquid is effectively prevented, and relatively high yields are obtained with an apparatus of simple and inexpensive construction and of relatively small dimensions.

Although the present invention has been described in connection with a preferred embodiment thereof, variations and modifications may be resorted to by those skilled in the art without departing from the principles of the present invention. All of these variations and modifications are considered to be within the true spirit and scope of the present invention, as disclosed in the present description and defined by the appended claims.

I claim:

1. The method of distilling liquids having relatively high boiling points including fatty acids and glycerine which comprises establishing a body of liquid to be distilled in a suitable vessel, heating said body of liquid to distillation temperatures, subjecting said liquid to agitation and vertical circulation, establishing a second body of liquid within said vessel from a portion of said agitated and vertically circulated liquid, subjecting said second body of liquid to heat to finish the distillation thereof, collecting vapors from both bodies of liquid in a common vapor space, and withdrawing distillation residues from said second body of liquid.

2. The method of distilling liquids having relatively high boiling points including fatty acids and glycerine which comprises subjecting a body of liquid to the effect of distillation temperatures to cause partial distillation thereof, agitating said liquid to continuously propel part thereof above the level of said body of liquid, trapping a portion of said propelled liquid in a secondary body of liquid above the level of said first body of liquid, finishing distillation of the liquid whilst flowing horizontally within said secondary body, collecting vapors from both bodies of liquids in a common vapor space, withdrawing vapors from both bodies simultaneously from said common vapor space, and withdrawing distillation residues from said secondary body of liquid.

3. The method of distilling liquids having relatively high boiling points including fatty acids and glycerine which comprises partially distilling a body of liquid, subjecting said body of liquid to agitation and vertical circulation to cause part thereof to be elevated to a substantial height above the level of said body of liquid, trapping a portion of said elevated liquid, finishing distillation of said trapped liquid collecting vapors from said body of liquid and from said trapped liquid in a common vapor space, withdrawing vapors from said common vapor space, and withdrawing distillation residues from said trapped liquid.

4. The method of distilling liquids having relatively high boiling points including fatty acids and glycerine which comprises establishing a body of liquid to be distilled, indirectly heating said body of liquid to distillation temperatures, subjecting said liquid to the direct effect of steam to agitate same and to cause vertical circulation of said liquid above the level of said body of liquid, trapping a portion of said vertically circulated liquid, establishing a secondary body of liquid from said trapped liquid above said first body of liquid, subjecting said secondary body of liquid to heat and to agitation to finish distillation thereof whilst streaming horizontally, collecting vapors from both bodies of liquids in a common vapor space, and withdrawing distillation residues from said secondary body of liquid.

5. The method of distilling liquids having relatively high boiling points including fatty acids and glycerine which comprises continuously feeding liquid to be distilled into a distillation apparatus to form a body of liquid therein, subjecting said body of liquid to indirect exchange with steam to heat same to distillation temperatures, steam agitating said body of liquid to cause vertical circulation thereof, trapping a portion of said vertically circulated liquid, establishing an annular secondary body of liquid above said first body of liquid from said trapped liquid, heating said secondary body of liquid to a temperature higher than said first body of liquid to finish the distillation thereof, and continuously withdrawing distillation residues from said secondary body of liquid.

6. The method of distilling liquids having relatively high boiling points including fatty acids and glycerine which comprises establishing a body of liquid to be distilled, heating said body to distillation temperatures, elevating portions of said liquid above the level of said body by passing a gaseous medium therethrough, establishing a second body of liquid slowly moving in a predetermined path from a portion of said elevated liquid, subjecting said second body of liquid to heat to finish the distillation thereof, collecting vapors from both bodies of liquid in a common vapor space, and withdrawing distillation residues from said second body of liquid.

7. The method of distilling liquids having relatively high boiling points including fatty acids and glycerine which comprises establishing a bath of liquid to be distilled, subjecting said bath to the effect of distillation temperatures to cause evaporation of a portion thereof, conducting a gaseous medium through said bath to cause continuous circulation of the liquid therein and to elevate a portion of said liquid above the surface of said bath, diverting at least a portion of the elevated liquid, introducing said diverted liquid into an annular space, passing said diverted liquid through said annular space to an outlet, heating said diverted liquid and passing a gaseous medium through said diverted liquid whilst positively circulating through said annular space to complete the distillation of said liquid, and collecting the vapors evolved from said bath and from said diverted liquid in a common vapor space.

8. The method of distilling liquids having relatively high boiling points including fatty acids and glycerine which comprises establishing a bath of liquid to be distilled, subjecting said bath to the effect of distillation temperatures to cause evaporation of a portion thereof, conducting a gaseous medium through said bath to cause continuous circulation of the liquid therein and to elevate a portion of said liquid above the surface of said bath, branching off a portion of said elevated liquid to form a secondary bath, passing said secondary bath through an annular space, heating said secondary bath, passing a gaseous medium through said secondary bath to complete the distillation of said liquid, and collecting the vapors evolved by both baths in a common vapor space.

9. The method of distilling liquids having relatively high boiling points including fatty acids and glycerine which comprises establishing a bath of liquid to be distilled, subjecting said bath to the effect of distillation temperatures to cause evaporation of a portion thereof, conducting a gaseous medium through said bath to elevate successive portions of the liquid thereof above the surface of said bath, diverting portions of said elevated liquid to an annular space to form a second bath therein having a vapor space in common with that of the first bath, heating said second bath to distillation temperatures and passing a gaseous medium therethrough to further distill the liquid therein while the liquid thereof passes through said annular space, and withdrawing vapors evolved by both baths from said common vapor space.

KARL SONDERMANN.